United States Patent Office 2,744,924
Patented May 8, 1956

2,744,924

1-THIOCYANO-4,5,6,7,8,8-HEXAHALO-3a,4,7,7a-TETRAHYDRO-4,7-METHANOINDENE

Simon H. Herzfeld, Chicago, Ill., assignor to Velsicol Chemical Corporation, a corporation of Illinois No Drawing. Application May 31, 1952,
Serial No. 291,072

3 Claims. (Cl. 260—454)

This invention relates to the production of new compositions of matter. More specifically, this invention relates to the production of 1-thiocyano-4,5,6,7,8,8-hexahalo-3a,4,7,7a-tetrahydro-4,7-methanoindene wherein the halogen atoms in the 4 to 8 positions are of the group consisting of chlorine and bromine.

One object of the present invention is the production of new compositions of matter which are useful insecticides.

Another object of this invention is the selective replacement of the halogen in the number one position in 1,4,5,6,7,8,8-heptahalo - 3a,4,7,7a-tetrahydro - 4,7-methanoindene with a thiocyano group without affecting other halogen atoms contained in said indene compound.

These and other objects of the present invention will be apparent from the following specification.

Broadly the products of the present invention are prepared by reacting 1,4,5,6,7,8,8-heptahalo-3a,4,7,7a-tetrahydro-4,7-methanoindene, wherein the halogen in the 1 position is chlorine, bromine or iodine and the halogens in the 4 to 8 positions are bromine or chlorine, with an alkali metal thiocyanate in an inert solvent, and recovering the 1-thiocyano derivative therefrom. The replacement of halogen in the 1 position by a thiocyano group using an alkali metal thiocyanate as the reagent is specific and leaves the other halogens in the molecule unaltered.

The starting material of the present invention is 1,4,5,-6,7,8,8-heptahalo-3a,4,7,7a-tetrahydro-4,7- methanoindene which may be prepared from 4,5,6,7,8,8-hexahalo-3a,4,-7,7a-tetrahydro-4,7-methanoindene. Said latter compounds may be prepared from hexahalocyclopentadiene and cyclopentadiene.

Hexahalocyclopentadiene may be prepared by the reaction of cyclopentadiene with a suitable alkali metal hypohalite. For example to prepare hexachlorocyclopentadiene, cyclopentadiene may be reacted with sodium hypochlorite in an aqueous, alkaline solution. Similarly, to prepare hexabromocyclopentadiene, cyclopentadiene may be reacted with sodium hypobromite in an aqueous alkaline medium.

Hexachlorocyclopentadiene or hexabromocyclopentadiene formed either in accordance with the foregoing, or by any other process may be reacted with cyclopentadiene at a temperature below about 200° C. to form 4,5,6,7,8,8-hexahalo-3a,4,7,7a-tetrahydro-4,7-methanoindene wherein the halogens are of the group chlorine and bromine. For simplicity, the chlorine containing compound is hereinafter termed chlordene, and the bromine containing compound is hereinafter termed bromodene. Hereafter, while only chlordene will be discussed in detail, it is understood that bromodene, being substantially equivalent, may be utilized in a like manner having regard only for its difference in molecular weight.

1-chloro-chlordene may be obtained by the chlorination of chlordene with chlorine in the presence of fuller's earth, in a suitable relatively inert solvent, until a substantially equimolar quantity of chlorine reacts with the chlordene. 1-bromo-chlordene may be prepared by the bromination of chlordene in a solvent in the presence of peroxides. 1-iodo-chlordene may be prepared by reacting either 1-bromo- or 1-chloro-chlordene with sodium iodide in a suitable solvent.

For the purpose of illustration, the following specific example of a preparation of 1-bromo-chlordene is given.

EXAMPLE I

*Preparation of 1-bromo chlordene*

A solution containing 339 g. (1 mole) of chlordene and 5 grams of lauryl peroxide in 800 ml. of carbon tetrachloride was placed in a 2-liter, 3-necked flask equipped with a reflux condenser, mechanical stirrer, thermometer and dropping funnel. This solution of chlordene was warmed to 50–55° C. and a bromine solution consisting of 176 grams bromine in 200 ml. carbon tetrachloride was introduced with a slow rate of stirring. The addition of the bromine solution was carried out at such a rate as to maintain the temperature of the reaction vessel at 55° C. After addition was completed, the solution was refluxed for one-half hour to insure a complete reaction. The reaction mixture was then washed with an excess of sodium bisulfite solution, washed with water, and dried with anhydrous magnesium sulfate. The solvent was removed in vacuo and the residue distilled at 0.5 mm. of mercury pressure. The desired product thus obtained boiled at 131–132° C.

In accordance with the present invention, 1-thiocyano-chlordene is obtained by the reaction of a 1-halo-chlordene, as previously defined, with an alkali metal thiocyanate. For example, sodium, lithium or potassium thiocyanate are satisfactory for the present preparation. A suitable solvent for the present invention is a polar solvent such as an alcohol, e. g. methanol, ethanol, i-propanol, n-propanol, a ketone, e. g. acetone, methyl ethyl ketone, or other oxygenated solvent, e. g. dioxane or methylal.

The following is an example of a specific preparation of 1-thiocyano-chlordene.

EXAMPLE II

*Preparation of 1-thiocyano chlordene*

A solution of 42 grams (0.1 mole) of 1-bromo chlordene and 14.6 grams (0.15 mole) of potassium thiocyanate in 200 ml. of reagent grade acetone was refluxed for two hours. After cooling and separation of KBr by filtration, the acetone was removed by evaporation on a steam bath and the organic residue was taken up in ether. The ether solution of the product was washed with water and dried with anhydrous magnesium sulfate. Removal of the ether by evaporation, and crystallization of the product from pentane yielded 30 grams of crystals. This desired product when recrystallized twice from methanol had a melting point of 85–87° C.

|  | C | H | Cl |
|---|---|---|---|
|  | Percent | Percent | Percent |
| Analysis of pure product | 33.56 | 1.29 | 53.75 |
| Calculated for $C_{10}H_5Cl_6SCN$ | 33.37 | 1.27 | 53.74 |

Sulfur test on pure product was positive.

The process illustrated in Example II is equally well applicable to 1-chloro- or 1-iodo-chlordene. Similarly 1-halo-bromodene can be utilized to prepare 1-thiocyano-bromo-dene in accordance with Example II by merely replacing 1-bromo-chlordene in the process of said example with its stoichiometric equivalent of the particular 1-halo-bromodene utilized.

The compounds of the present invention are useful as pesticides and more particularly as excellent insecticides. In addition these compositions are very useful as intermediates since they contain a functional group in a reactive position.

As an insecticide, the products of this invention can be applied in a liquid solvent, in fogs, as aqueous dispersions or as dusts. In general, these products may be formulated and applied as pesticides by any known means. They are soluble in most common organic solvents such as carbon tetrachloride, hexane, benzene, toluene, dimethyl naphthalene, esters, ethers, ketones and alcohols. They are substantially insoluble in water.

I claim as my invention:

1. As a new composition of matter, 1-thiocyano-4,5,6,7,8,8-hexahalo - 3a,4,7,7a-tetrahydro-4,7-methanoindene, wherein the halogens are of the group consisting of chlorine and bromine.

2. As a new composition of matter 1-thiocyano-4,5,6,7,8,8-hexachloro - 3a,4,7,7a-tetrahydro - 4,7-methanoindene.

3. As a new composition of matter, 1-thiocyano-4,5,6,7,8,8 - hexabromo - 3a,4,7,7a-tetrahydro - 4,7-methanoindene.

References Cited in the file of this patent

UNITED STATES PATENTS

| | | |
|---|---|---|
| 2,395,455 | Bruson | Feb. 26, 1946 |
| 2,519,190 | Hyman | Aug. 15, 1950 |
| 2,530,408 | Stahly | Nov. 21, 1950 |
| 2,583,569 | Herzfeld et al. | Jan. 29, 1952 |